(12) United States Patent
Mullet et al.

(10) Patent No.: US 7,123,128 B2
(45) Date of Patent: Oct. 17, 2006

(54) PRE-INSTALLED APPLIANCE AND METHOD FOR PURCHASING THE SAME

(75) Inventors: Willis J. Mullet, Gulf Breeze, FL (US); Yan Rodriguez, Canton, OH (US); Thomas B. Bennett, III, Wooster, OH (US)

(73) Assignee: Wayne-Dalton Corp., Mt. Hope, OH (US)

( * ) Notice: Subject to any disclaimer, the term of this patent is extended or adjusted under 35 U.S.C. 154(b) by 255 days.

(21) Appl. No.: 10/463,044

(22) Filed: Jun. 17, 2003

(65) Prior Publication Data

US 2004/0257198 A1 Dec. 23, 2004

(51) Int. Cl.
*B60R 25/00* (2006.01)

(52) U.S. Cl. .................. 340/5.71; 340/5.28; 340/5.42; 340/5.64

(58) Field of Classification Search ............... 340/5.71, 340/5.27, 5.28, 5.42, 5.74, 5.31, 5.54, 825.56, 340/5.7; 705/32, 40; 318/16; 368/10; 235/382.5
See application file for complete search history.

(56) References Cited

U.S. PATENT DOCUMENTS

| | | | | |
|---|---|---|---|---|
| 4,624,578 | A | * | 11/1986 | Green ........................ 368/10 |
| 4,700,296 | A | * | 10/1987 | Palmer et al. ................ 705/32 |
| 4,988,987 | A | | 1/1991 | Barrett ................... 340/825.31 |
| 5,510,780 | A | * | 4/1996 | Norris et al. ........... 340/825.56 |
| 5,705,991 | A | * | 1/1998 | Kniffin et al. ............. 340/5.28 |
| 5,872,513 | A | * | 2/1999 | Fitzgibbon et al. ........ 340/5.28 |
| 6,075,688 | A | | 6/2000 | Willard et al. ................. 361/92 |
| 6,166,525 | A | | 12/2000 | Crook ........................ 322/11 |
| 6,172,432 | B1 | | 1/2001 | Schnackenberg et al. ..... 307/23 |
| 6,177,780 | B1 | | 1/2001 | Roy et al. ................... 320/128 |
| 6,188,198 | B1 | | 2/2001 | Gunton ....................... 320/117 |
| 6,195,648 | B1 | * | 2/2001 | Simon et al. ................. 705/40 |
| 6,355,885 | B1 | | 3/2002 | Rintz et al. ................... 174/66 |
| 6,392,349 | B1 | | 5/2002 | Crenshaw .................... 315/86 |
| 6,489,746 | B1 | | 12/2002 | Pettinato ..................... 320/111 |
| 6,502,044 | B1 | | 12/2002 | Lane et al. .................. 702/63 |

FOREIGN PATENT DOCUMENTS

| | | |
|---|---|---|
| AU | 199712267 B2 | 1/1997 |
| WO | WO 03/050717 A1 | 6/2003 |

* cited by examiner

*Primary Examiner*—Edwin C. Holloway, III
(74) *Attorney, Agent, or Firm*—Renner Kenner Greive Bobak Taylor & Weber

(57) ABSTRACT

A limited-use appliance is disclosed which has at least one input device for generating an input signal and a controller associated with the input device and receiving the input signal. The controller initiates at least one limited-use function of the appliance upon receipt of the input signal. A test device is maintained by the controller, and has a predetermined criteria which determines whether the input signal should be sent on to the controller or not. A method for pre-installing an appliance is also disclosed and includes the steps of pre-installing an appliance with a controller, wherein the controller operates the appliance in a limited manner. An input device from a group of input devices is associated with the controller, wherein the input device generates an input signal to operate the appliance. And the pre-determined criteria maintained by the controller is tested such that the input signal from the controller is blocked when the pre-determined criteria is met. The appliance is most likely a garage door operator, but it could be any large appliance that is installed prior to the purchase of a home or facility.

19 Claims, 4 Drawing Sheets

PRE-INSTALLED APPLIANCE AND METHOD FOR PURCHASING THE SAME

TECHNICAL FIELD

Generally, the present invention relates to a pre-installed appliance, such as a garage door operator system for use on a closure member moveable relative to a fixed member and a method for purchasing the same. More particularly, the present invention relates to a pre-installed appliance that is either purchased or leased directly from a manufacturer. More specifically, the present invention relates to a garage door operator that has limited use capabilities which can only be fully implemented upon a lease or purchase of an activation code from the manufacturer.

BACKGROUND ART

When constructing a home or a facility, it is well known to provide garage doors which utilize a motor to provide opening and closing movements of the door. Motors may also be coupled with other types of movable barriers such as gates, windows, retractable overhangs and the like. An operator is employed to control the motor and related functions with respect to the door. The operator receives command input signals for the purpose of opening and closing the door from a wireless remote, from a wired wall station, from a keyless entry device or other similar device. It is also known to provide safety devices that are connected to the operator for the purpose of detecting an obstruction so that the operator may then take corrective action with the motor to avoid entrapment of the obstruction.

To assist in moving the garage door or movable barrier between limit positions, it is well known to use a remote radio frequency or infrared transmitter to actuate the motor and move the door in the desired direction. These remote devices allow for users to open and close garage doors without having to get out of their car. These remote devices may also be provided with additional features such as the ability to control multiple doors, lights associated with the doors, and other security features. As is well documented in the art, the remote devices and operators may be provided with codes that change after every operation cycle so as to make it virtually impossible to "steal" a code and use it a later time for illegal purposes. An operation cycle may include opening and closing of the barrier, turning on and off a light that is connected to the operator and so on.

Currently, barrier operators are one of the last devices that are installed at a construction site. There are many reasons for this, one of which is that once the barrier operator is installed, the access needed by the construction crews is limited. In other words, once the barrier operator is installed and connected to the movable barrier, construction crews may not have access into the facility to perform their designated functions. Another reason is that if the barrier operator is installed early on in the construction, the appearance of the operator may be diminished, inasmuch as painting and texturing of the surrounding structure may be undertaken. Finally, the portable remote control devices which are used to actuate the operator may become lost or stolen.

One way around this problem is to have just the barrier, such as a garage door, without an operator, installed during construction for the purpose of having a storage place for construction materials being used and appliances that will be later installed in the home or facility. However, if these materials are not secure, they can also be stolen. Manual locks may be used, but that means a construction crew must ensure that they have a key for access. Further, many garages today have surfaces that are painted or otherwise finished. The installation of a garage door or a garage door operator must be attached directly to the frame components of the structure and not have materials positioned between the structure and the component, which may lead to premature failure of the attachment. Accordingly, it is quite desirable for the garage door or movable barrier and the associated operator to be installed prior to the garage being finished.

Another drawback for the installation of barrier operators, and, for that matter any large appliance, such as a furnace, an air conditioning unit, a sauna, a refrigerator and the like, is that the appliances are purchased in a similar manner and charged to the customer at closing. Until then, the builder or contractor is responsible for all costs incurred. Accordingly, depending on the number of appliances installed, purchases of the appliances can amount to a significant portion of the expenses to the builder or contractor and a significant portion of the closing costs. As will be appreciated, this can be a significant outlay of funds and if, for whatever reason, the purchaser cannot pay the closing costs, the contractor is liable.

Therefore, there is a need in the art for a pre-installed appliance and a method for purchasing the same, wherein the cost for the appliance is passed directly on the purchaser instead of a contractor building a facility.

DISCLOSURE OF THE INVENTION

One of the aspects of the present invention, which shall become apparent as the detailed description proceeds, is achieved by a limited-use appliance comprising at least one input device for generating an input signal, a controller associated with the input device and receiving the input signal, the controller initiating at least one limited-use function of the appliance upon receipt of the input signal; and a test device maintained by said controller, wherein the test device has a predetermined criteria which determines whether the input signal should be sent on to the controller.

Another aspect of the present invention is attained by a method for pre-installing an appliance, comprising pre-installing an appliance with a controller which operates the appliance in a limited manner; associating an input device from a group of input devices with the controller, wherein said input device generates an input signal to operate the appliance; testing a pre-determined criteria maintained by the controller; and blocking the input signal from the controller when the pre-determined criteria is met.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
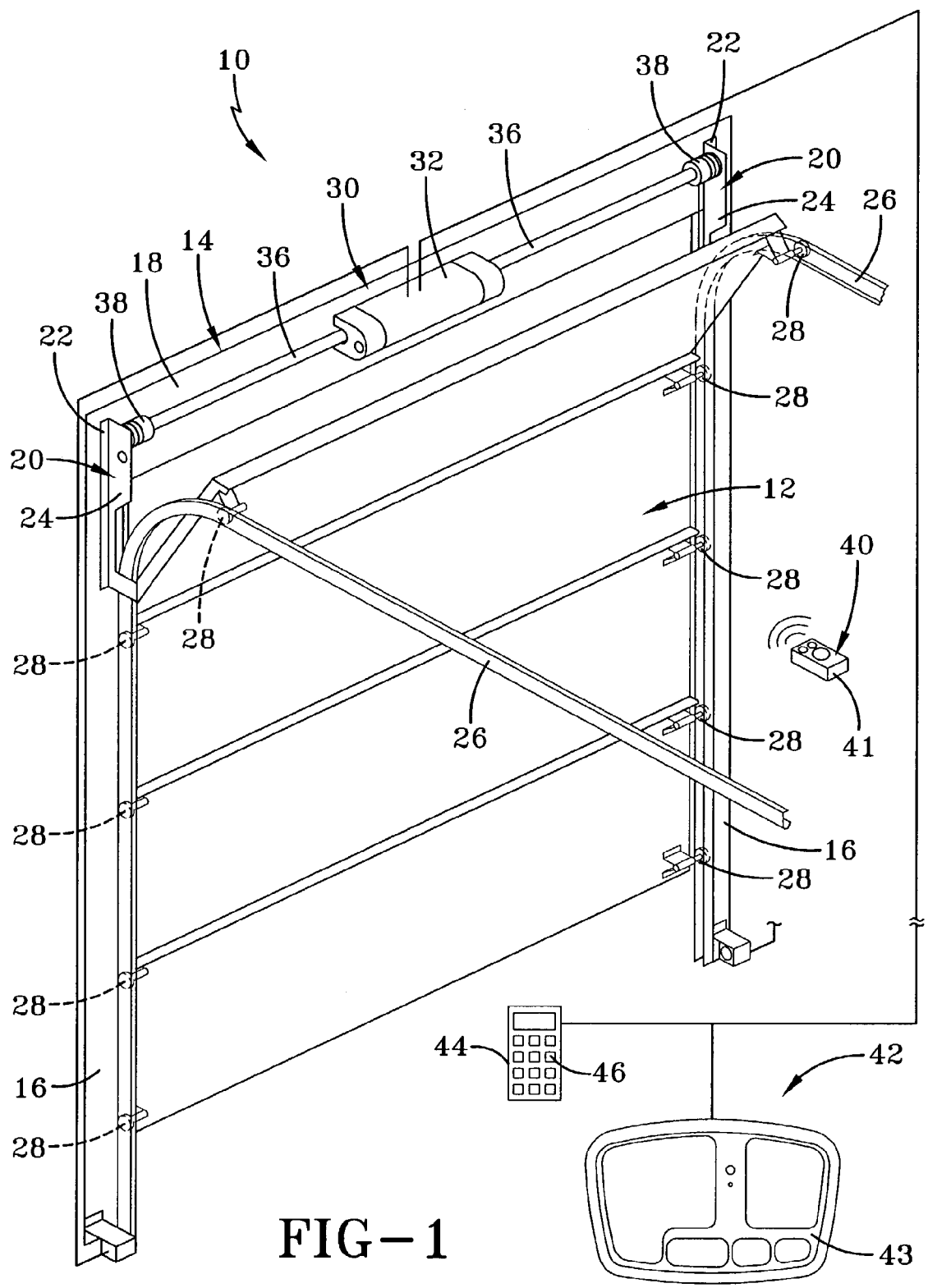
FIG. 1 is a perspective view depicting a sectional garage door and showing an operating mechanism embodying the concepts of the present invention.

An appliance, such as a garage door operator system which incorporates the concepts of the present invention is generally designated by the numeral 10 in FIG. 1. Although the present discussion is specifically related to an appliance such as a garage door operator, it will be appreciated that the teachings of the present invention are applicable to other large appliances. In any event, the system 10 is employed in conjunction with a conventional sectional garage door generally indicated by the numeral 12. The door 12 may or may not be an anti-pinch type door. The opening in which the door is positioned for opening and closing movements relative thereto is surrounded by a frame, generally indicated by the numeral 14, which consists of a pair of a vertically spaced jamb members 16 that, as seen in FIG. 1, are generally parallel and extend vertically upwardly from the ground. The jambs 16 are spaced and joined at their vertical upper extremity by a header 18 to thereby form a generally u-shaped frame 14 around the opening for the door 12. The frame 14 is normally constructed of lumber or other structural building materials for the purpose of reinforcement and to facilitate the attachment of elements supporting and controlling the door 12.

Secured to the jambs 16 are L-shaped vertical members 20 which have a leg 22 attached to the jambs 16 and a projecting leg 24 which perpendicularly extends from respective legs 22. The L-shaped vertical members 20 may also be provided in other shapes depending upon the particular frame and garage door with which it is associated. Secured to each projecting leg 24 is a track 26 which extends perpendicularly from each projecting leg 24. Each track 26 receives a roller 28 which extends from the top edge of the garage door 12. Additional rollers 28 may also be provided on each top vertical edge of each section of the garage door to facilitate transfer between opening and closing positions.

A counterbalancing system generally indicated by the numeral 30 may be employed to balance the weight of the garage door 12 when moving between open and closed positions. One example of a counterbalancing system is disclosed in U.S. Pat. No. 5,419,010, which is incorporated herein by reference. Generally, the counter-balancing system 30 includes a housing 32, which is affixed to the header 18 and which contains an operator mechanism 34 best seen in FIG. 2. Extending through the operator housing 32 is a drive shaft 36, the opposite ends of which carry cable drums 38 that are affixed to respective projecting legs 24. Carried within the drive shaft 36 are counterbalance springs as described in the '010 patent. Although a header-mounted operator is disclosed, the control features to be discussed later are equally applicable to other types of operators used with movable barriers. For example, the control routines can be easily incorporated into trolley type operators used to move garage doors. The drive shaft 36 transmits the necessary mechanical power to transfer the garage door 12 between closed and open positions. In the housing 32, the drive shaft 36 is coupled to a drive gear wherein the drive gear is coupled to a motor in a manner well known in the art.

Briefly, the counter-balancing system 30 may be controlled by a wireless remote transmitter 40, which has a housing 41, or a wall station control 42, which has a housing 44, that is wired directly to the system 30 or which may communicate via radio frequency or infrared signals. The wall station control 42 is likely to have additional operational features not present in the remote transmitter 40. The wall station control 42 is carried by a housing 43 which has a plurality of buttons thereon which may be associated with activation numbers as will be discussed in detail later. The system 30 may also be controlled by a keyless alphanumeric device 44. The device 44 includes a display and a plurality of keys 46 with alphanumeric indicia thereon. Actuating the keys 46 in a predetermined sequence allows for actuation of the system 30. At the least, the devices 40, 42 and 44 are able to initiate opening and closing movements of the door coupled to the system 30. Although the present invention is described in the context of a sectional garage door, the teachings of the invention are equally applicable to other types of movable barriers such as single panel doors, gates, windows, retractable overhangs and any device that at least partially encloses an area. And, as noted previously, the invention is applicable to any major appliance which is installed in a location during construction of a facility. For example, the teachings of the present invention are applicable to heating and air conditioning systems, refrigerators, ovens, hot tubs, saunas or any device which is installed before or after construction of a facility and which a user would rather lease than purchase outright.

Figure 2:
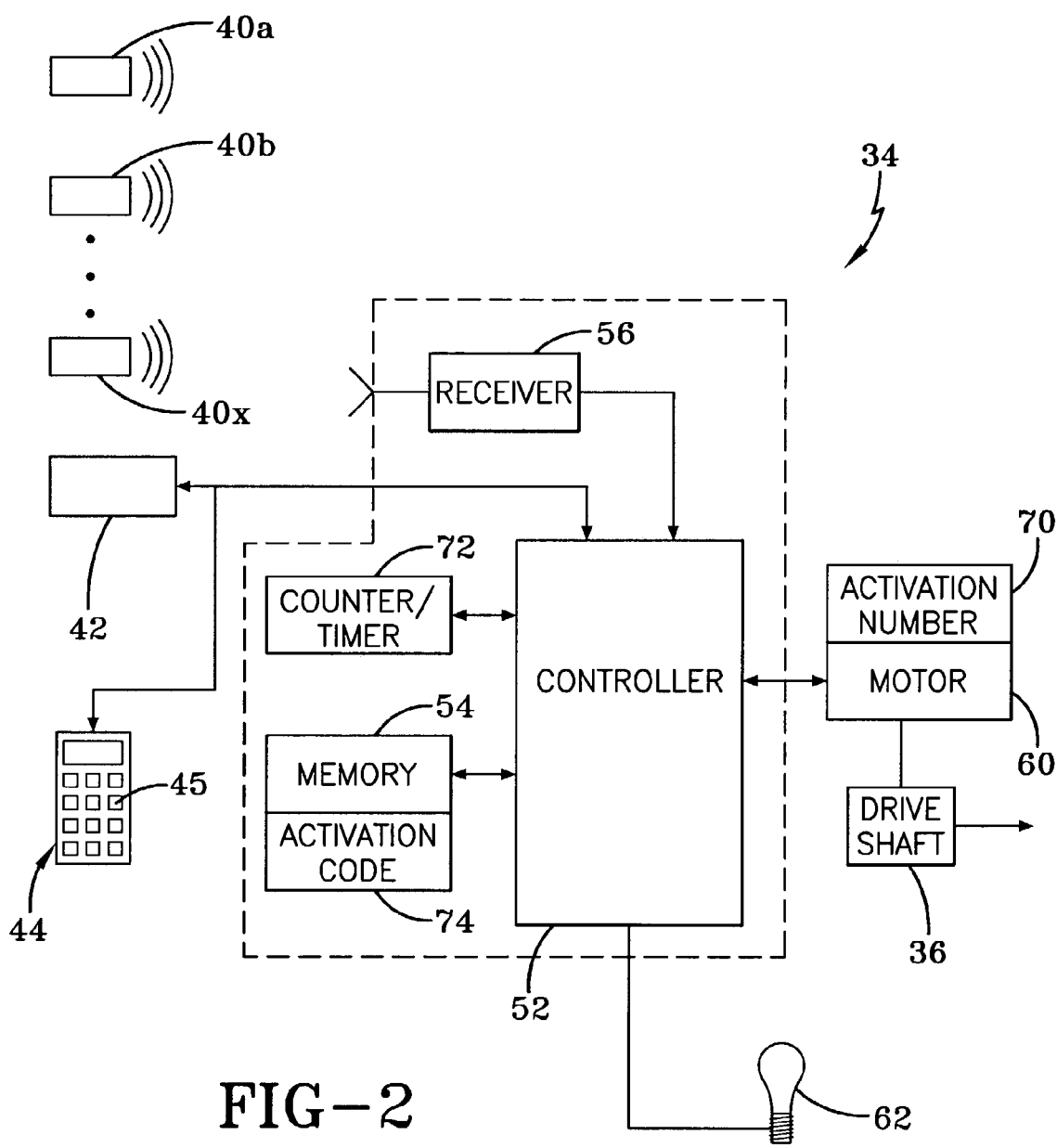
FIG. 2 is a block drawing of an operator according to the present invention.

An operator mechanism, which is designated generally by the numeral 34 in FIG. 2, is contained within the housing 32 and monitors operation of the motor and various other elements connected to the operator mechanism 34 as will be described hereinbelow. A power source is used to energize the foregoing elements.

The operator mechanism 34 includes a controller 52 which incorporates the necessary software, hardware and memory storage devices for controlling the operation of the operator mechanism 34. In electrical communication with the controller 52 is a non-volatile memory storage device 54 for permanently storing information utilized by the controller in conjunction with the operation of the operator mechanism 34. Infrared and/or radio frequency signals are received by a receiver 56 which transmits the received information to a decoder contained within the controller. The controller 52 converts the received radio frequency signals or other types of wireless signals into a usable format. It will be appreciated that an appropriate antenna is utilized by the receiver 56 for receiving the desired signals. It will also be appreciated that the controller 52 is capable of directly receiving transmission type signals from a direct wire source as evidenced by the direct connection to the wall station 42. And the keyless device 44, which may also be wireless, is also connected to the controller 52. As such, one can use the appliance, which in this case is the operator mechanism 34, by entering a four- or five-character identification number. In any event, any number of remote transmitters 40*a-x* can transmit a signal that is received by the receiver 56 and further processed by the controller 52 as needed. Likewise, there can be any number of wall stations. If the input signals received from either the remote transmitter 40, or the wall station control 42 or the keyless device 44 are acceptable, the controller 52 generates the appropriate electrical input signals for energizing the motor 60 which in turn rotates the drive shaft 36 and opens and/or closes the movable barrier. A light 62, which may be turned on and off independently or whenever an open/close cycle is initiated, may also be connected to the controller 52.

Implementation of the present invention requires additional features to be associated with the operator mechanism 34. In particular, an activation number indicia 70 is provided on the motor 60, on the operator housing 32 and/or on any partially concealed location. In other words, the activation number indicia 70 is easily found upon reading the instructions provided with the operator mechanism, such that the indicia can be easily read without much difficulty. Use of the activation number indicia 70 will be discussed in detail below.

A counter/timer, designated generally by the numeral 72, is associated with the controller and is collectively referred to as "predetermined criteria." The counter/timer is a programmable feature of the controller and allows the manufacturer of the operator mechanism to set a criteria which allows for limited use of the operator mechanism and the associated appliance for a predetermined period of time or predetermined number of cycles. In other words, the counter feature allows a user, upon installation of the appliance, and in this case a garage door operator, to fully open and close a barrier for 120 cycles. Of course, the number of cycles may be adjusted as deemed appropriate. In the event a timer feature is utilized with the operator mechanism a date can be programmed into the counter/timer 72 such that after a certain date, the operator mechanism is disabled. Likewise, once the counter mechanism has decremented to zero, then the operator is likewise disabled. Of course an up counter could also be utilized. If desired, the operator mechanism may be allowed to operate the light 62 but not be able to open and close the device after the predetermined criteria is met. Indeed, upon expiration of the predetermined criteria, that is, the number of cycles has been depleted or the date has been exceeded, the operation of the device may default to either an open or closed position and in the preferred embodiment the open position would be maintained.

Stored in the memory device 54 is an activation code 74. The activation code is correlated with the activation number 70 such that transmission of an activation number to a third party or to the manufacturer would allow them to provide the activation code which allows for extended operation of the operator mechanism 34. In other words, use of the activation code will allow for the counter number to be increased, or the time or expiration date to be adjusted. It will be appreciated that there may be more than one activation code stored in memory so as to allow for multiple renewals or adjustments of the counter/timer 72. It will also be appreciated that the activation code 74 may be further distinguished as an activation lease code, which would require adjustment of the counter/timer or an activation purchase code which would eliminate the need for the counter/timer upon purchase of the operator mechanism.

Figure 3:
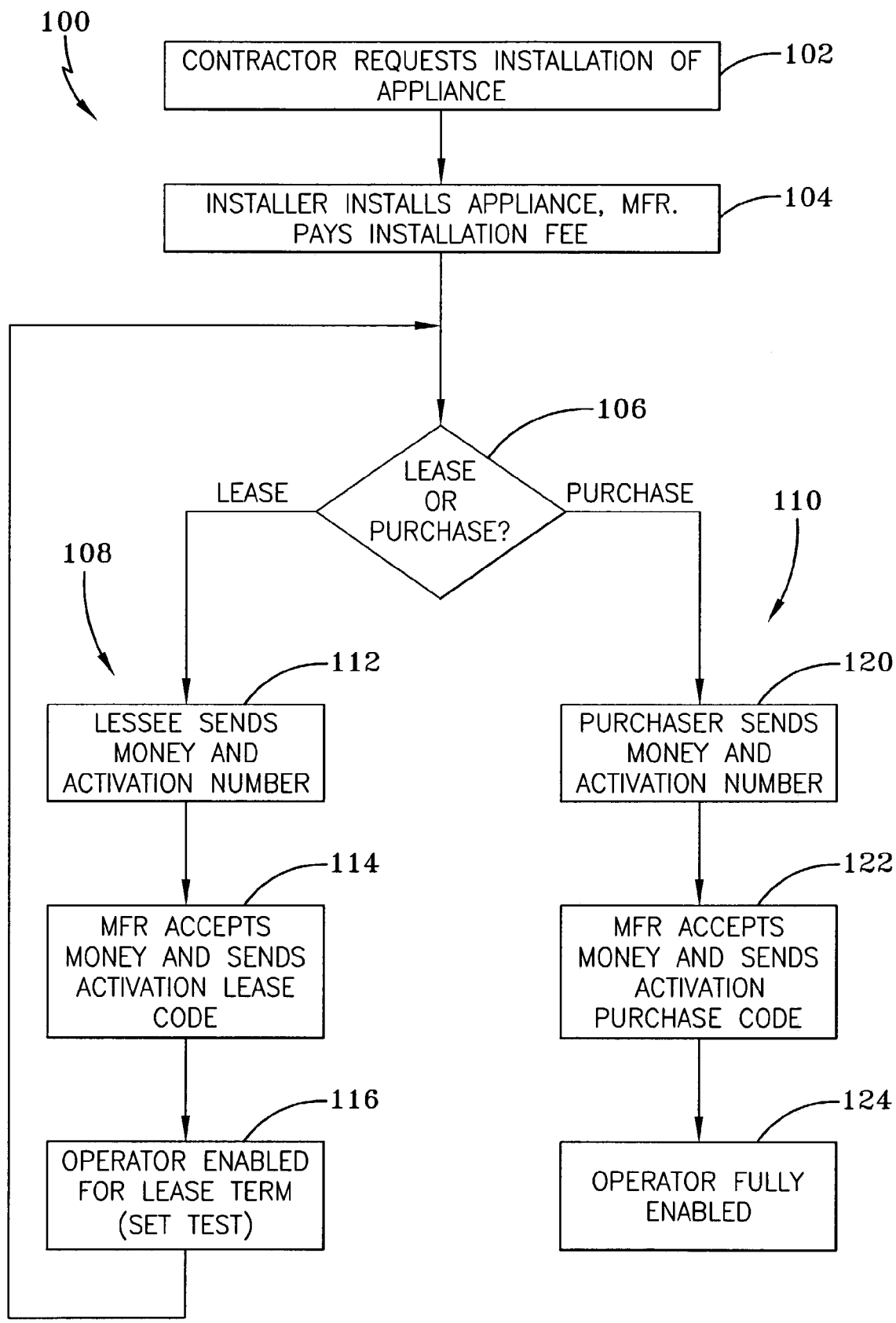
FIG. 3 is an operational flow chart illustrating the purchase or lease of a pre-installed operator according to the present invention.

Referring now to FIG. 3, an operational flow chart for establishing the relationship between the manufacturer of an appliance and the purchaser and/or renter of the appliance is designated generally by the numeral 100. At a first step 102, a contractor requests installation of an appliance from an authorized dealer or directly from a manufacturer. At step 104, the dealer installs the appliance and the manufacturer pays the installer or the authorized dealer an installation fee.

At step 106, the purchaser of the home or facility decides whether to lease or purchase the appliance. In one scenario, the appliance may be installed and become fully functional at a later time. In this scenario, the contractor could lease the appliance and charge the owner later, or require the prospective home owner to proceed with the lease. Accordingly, the contractor would be allowed to enter and access the garage or other opening as needed to secure tools, materials and other items. In the preferred embodiment, the appliance is installed with the keyless device 46 so as to allow use of an alphanumeric code to allow access to the facility or home under construction. In this way, once the facility or home is finally completed, the alphanumeric code can be changed for security purposes. In another scenario, the contractor could simply require the prospective owner to purchase the appliance. If the contractor requires the facility owner or homeowner to proceed with leasing the device, then the process proceeds with the steps designated generally by the numeral 108 or, in the alternative, the installer may require the device to be directly purchased, as indicated by the steps designated generally by the numeral 110.

If the lease procurement steps 108 are selected, the lessee, at step 112, sends a currency amount, either electronically or via a credit card, and the activation number 70 to the appliance manufacturer or designated representative. At step 114 the manufacturer or their representative accepts the currency amount and sends an activation lease code 74 back to the lessee. As discussed previously, the activation lease code will only allow for the controller 52 to adjust the counter/timer 72 an appropriate amount. Accordingly, the manufacturer and the lessee may agree to a predetermined number of uses or time period for which the lease agreement can extend. For example, the lessee may only be using the facility for a month and would only desire a month's use of the appliance. In the alternative, the lessee may desire six months use of the appliance and, as such, an appropriate activation lease code could be submitted to the lessee, which would be recognized for the counter/timer as an appropriate amount. It will also be appreciated that manufacturer could configure a telephone line or wireless-type communication device with the operator mechanism to allow for programming the number of uses and/or expiration date of the lease agreement. In any event, at step 116 the lessee enables the operator mechanism for lease by submitting the activation lease code 74 via the keyless device 46. Alternatively, the manufacturer could send a remote transmitter by overnight delivery that enables operation of the controller for a certain period of time. Or the lessee may utilize a remote transmitter shipped with the operator, wherein activation of a series of buttons on the remote extends the lease period. In any event, after completion of step 116, the process returns to step 106 for whenever the lease period expires or for whenever an individual decides to purchase the appliance outright.

In much the same manner as the lease steps, the purchase steps 110 include a step 120, wherein the purchaser sends a specified currency amount and the activation number associated with the appliance. At step 122 the manufacturer accepts the currency and sends an activation purchase code to the purchaser. Alternatively, the manufacturer can send a series of remote transmitters and wall stations that implement and allow for full operation of the operator mechanism. Use of such transmitters will permanently erase or bypass the counter/timer criteria used by the controller 52 to prevent any disruption in service associated with the counter or timer. Accordingly, at step 124 entry of the appropriate activation purchase code fully enables the operator mechanism 34.

It will be appreciated that by utilizing the keyless entry transmitter that over one million activation numbers/codes are available. The keyless entry transmitter can either be a 5-button or a 10-button model. For example, the activation number could be a 10-character code, such as 1022A-CD334. In turn, the activation code could be an 8- or a 10-number code. These numbers could then be entered in a predetermined sequence along with certain function buttons on the keyless transmitter as necessitated by the software implemented on the controller and associated devices.

The activation numbers can be generated by a random number algorithm that remains confidential and secure with the manufacturer and wherein the algorithm can be used to associate the activation number with the activation code. Activation numbers are stored in an appropriate computer memory file and associated with each of the activation devices. The activation number is preferably stored in the memory 54 in a ROM or EEPROM at board-level test or at end-of-line opener head test in the operator mechanism manufacturing process. And the activation number is preferably printed onto at least two different labels: one for motor control board marking and one for opener and closure marking. The board-level marking may be readable with the cover of the operator housing removed.

One option for completing the transaction between the manufacturer and the owner of the home or facility is that the purchaser can call the installing dealer, complete their payment and the dealer can provide the purchaser with the necessary activation codes or a transmitter with an embedded electronic key and any additional components needed to allow for full enablement of the operator mechanism. In another option, the purchaser can call the appliance manufacturer or authorized agent, complete their payment and receive the activation codes or transmitter with the electronic key and any additional components can be shipped overnight. Alternatively, the purchaser could email the activation number to a secure web site maintained by the manufacturer which allows completion of their payment, a response with the activation codes by return email, and arrange for the shipment of any additional components by overnight delivery. Yet another alternative is for the purchaser to email the activation numbers to the manufacturer as suggested above but wherein the manufacturer sends the appropriate activation codes for the appliance via a phone line connected to the appliance and schedules for shipment of any additional components. Credit cards may be processed by interfacing with an interactive voice response system that would allow a customer to use their voice or touch-tone phone to enter the activation number, and credit card number and in turn receive their activation code. Accordingly, a simple touch-tone telephone transaction could be used to exchange payment for the activation codes needed to fully enable the operator mechanism.

Figure 4:
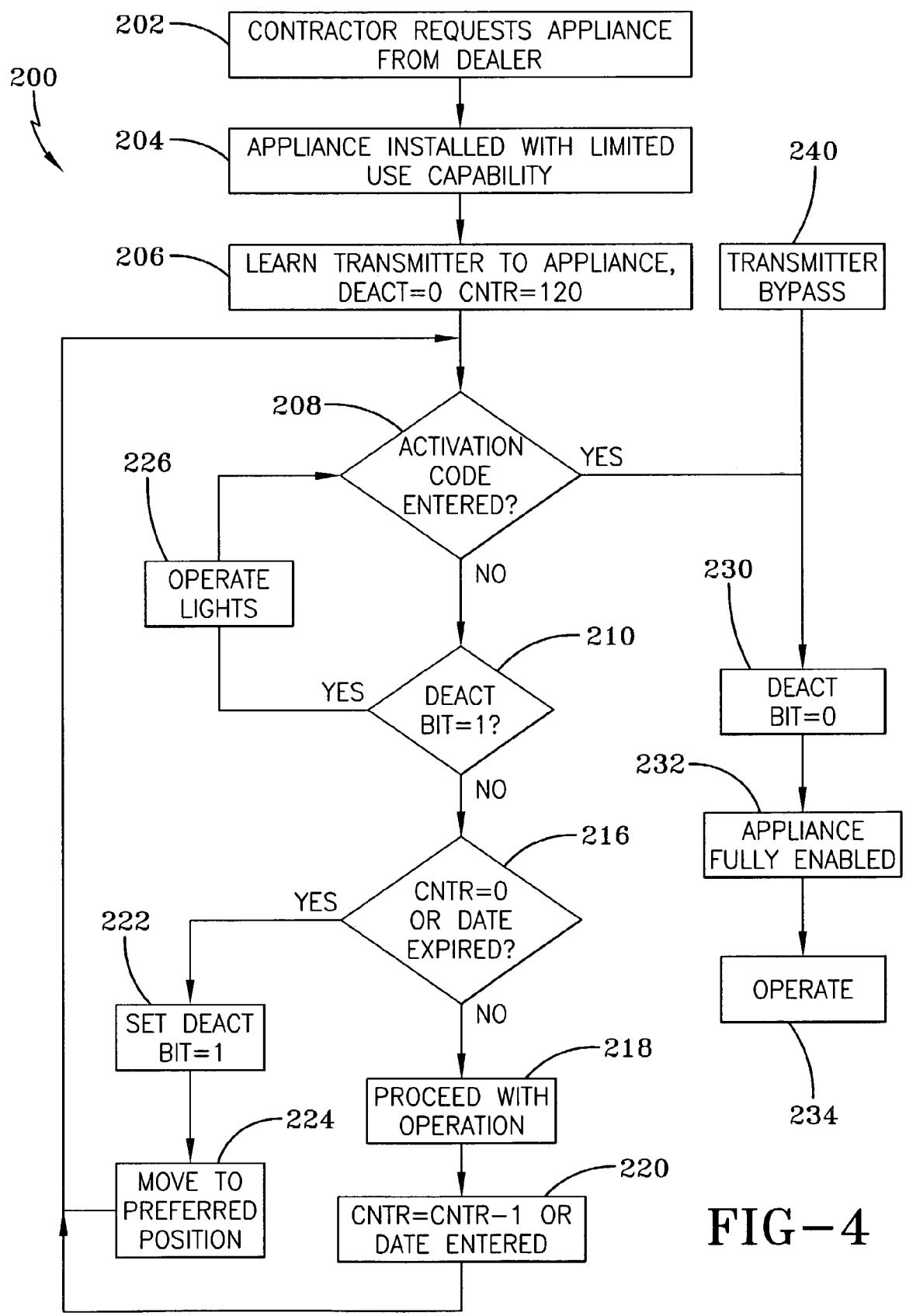
FIG. 4 is an operational flow chart for enabling and disabling the pre-installed operator.

Referring now to FIG. 4, it can be seen that the steps for implementing the operator mechanism's operation are designated generally by the numeral 200. As previously discussed, at step 202 a contractor requests installation of an appliance from an authorized dealer. At step 204 the appliance is installed with the limited-use capability, wherein "limited-use" refers to the number of cycles or a predetermined expiration date. Following this, at step 206, a transmitter device such as the transmitter 44 is learned to the appliance such that it is recognized as the particular transmitter device controlling the appliance. At this time, a deactivation bit, which is maintained by the memory 54 of the operator mechanism, is set to zero and the counter/timer mechanism is set to the predetermined criteria. In the event a counter is used, it is believed that 120 open/close cycles will be used and if a date designation is selected, then approximately three months from the installation date will be stored in the counter/timer 72. Of course, other cycle numbers or expiration dates could be used.

Once a transmitter has been learned to the appliance operator, then, at step 208, the controller 52 looks for entry of an activation code. If an activation code is not received, the process continues to step 210 to determine whether a deactivation bit has been set to a value of 1 or zero. If the bit is not equal to 1, then the process proceeds to step 216 where the counter/timer is checked. If the counter is not equal to zero, or the date has not expired, then the operator proceeds with operation of the appliance. And at step 220 the counter is decremented by one or a new date value is entered for reference. The process then returns to step 208. However, if at step 216 it is determined that the use/timer cycle has expired, then the process proceeds to step 222 where the deactivation bit is reset to a value of one. At step 224 the appliance is moved to a preferred position, which in the case of a garage door is open.

The process then returns to the decision step 208 to determine whether at the next subsequent receipt of data or input as to whether the activation code has been entered. Presuming that the activation code has not been entered, the process again proceeds to step 210, whereupon if it is determined that the deactivation bit has been set to 1, then the appliance proceeds to step 226 to allow operation of the lights but no other functions of the appliance are permitted to be executed. Accordingly, the process is returned to the decision step 208. By the appliance not working it will be evident to the user of the device that the lease needs to be extended or that the device needs to be purchased for it to be used. Other light emitting indicia or audio signals could be used to indicate that the lease period has expired. In any event, the user will proceed to the steps outlined in FIG. 3 to obtain an activation lease code or an activation purchase code.

Once an activation code has been obtained and entered at step 208, the process will proceed to step 230 whereupon the deactivation bit is reset to zero and at step 232 the appliance is fully enabled and allowed to operate at step 234 utilizing all of the different transmitters that are useable with the operator.

In the foregoing steps, it will be appreciated that setting the deactivation bit allows for temporary operation of the device until such time that the counter or timer has expired. Accordingly, when the number of cycles has been completely used, the deactivation bit is set to 1 and this precludes or blocks the controller from submitting a normally operable input signal that allows for actuation of the motor and movement of the door and/or operation of the appropriate appliance. Once the device is purchased, then the deactivation bit is permanently cleared and set to zero so as to allow for uninterrupted operation of the operator 34. As such, the controller 52 is prevented from blocking the input signals.

At step 240 it will be appreciated that an appropriately programmed transmitter may be supplied by the manufacturer to automatically bypass the deactivation bit and/or counter cycle sequence of steps (208–226) so as to allow for permanent clearing of the deactivation bit and full operation of the operator mechanism as indicated by steps 230–234. This would allow for an installer or dealer to override any lease arrangement if that is deemed appropriate.

Based upon the foregoing, the advantages of the present invention are readily apparent. In particular, it will be appreciated that an operator appliance can be shipped fully operational and wherein the appliance will become non-functional after a predetermined number of operations or after a set period of time. Accordingly, the operator can only become fully operational again after a specific reactivation process, which includes submission of an activation number and an appropriate payment in return for an enabling activation code. Accordingly, payment for the operator or appliance can be collected when a reactivation process is requested. This allows for the operator to be shipped from a factory without remote transmitters such that only a single transmitting device may be employed during the leasing period. Upon ending of the leasing period and purchase of the operator, the remote transmitters can be shipped when the reactivation process is completed. These steps allow for the operator to be installed in the home or facility prior to the structure being finished. In the event the cycle time or lease period expires, the system allows for the operator to be partially functional inasmuch as the light associated with the appliance can be operated but nothing else.

These process and system advantages allow for the installing dealer or the factory to sell the appliance directly to the consumer, rather than utilizing the middle-man contractor. This benefits contractors in reducing their out-of-pocket expenses and the liability associated with the operating deice. Moreover, the hard wiring for the appliance can be specifically related to the particular installation and it allows for the appliance to be professionally installed at no additional cost to the builder or contractor. Yet another advantage of the present invention is that the cost of the appliance is not included in the construction of the home or facility, and as such, the value of the home is increased by having the appliances already installed.

Still further advantages of the present invention are that it allows for the installing dealer or factory representative to have direct communication with the customer, allowing ongoing service and support. The appliances can be ordered and billed directly to the consumer, rather than through the contractor or builder, and can be sold and installed prior to the structure being sold to reduce the selling price of the structure and reduce complications for any new home or facility buyer. Moreover, auxiliary components for the appliances, such as remote controls and cord sets, can be shipped at a later time and do not become lost or damaged by the construction crews. A primary benefit of this system and disclosed method is that it changes the point of sale from the builder/constructor to the dealer/factory. And since the appliance is installed prior to completion of the construction of the house or facility, it can be hard-wired for specific operations, eliminating the need for vestigial outlets. Accordingly, builders can become more competitive and provide a service which other builders do not offer.

Thus, it should be evident that the pre-installed appliance and method for purchasing the same disclosed herein carries out one or more of the objects of the present invention set forth above and otherwise constitutes an advantageous contribution to the art. As will be apparent to persons skilled in the art, modifications can be made to the preferred embodiments disclosed herein without departing from the spirit of the invention, the scope of the invention herein being limited solely by the scope of the attached claims.

What is claimed is:

1. A barrier operator installed as a limited-use appliance, wherein full enablement of the appliance is only implemented upon procurement by either purchase or lease of an activation code, the appliance comprising:
   at least one input device for generating at least one of an activation code input signal and a use input signal;
   a controller associated with said at least one input device and receiving said input signals, said controller initiating at least one limited-use function of the appliance upon receipt of said use input signal and initiating a test function of the appliance, and said controller having an activation number associated therewith;
   a memory device associated with said controller, said memory device storing an activation code, wherein said activation code is derivable from said activation number; and
   a test device maintained by said controller, said test device having a predetermined criteria which determines whether said use input signal should be sent on to said controller, said input device adapted to input said activation code via said activation code input signal, wherein if said inputted activation code matches said activation code stored in said memory device, said controller prevents said test device from blocking receipt of a subsequent said use input signal so that the appliance becomes fully enabled.

2. The limited-use appliance according to claim 1, wherein said test device is a counter set to a first predetermined value which is adjusted each time said use input signal is sent to said controller, and wherein said test device blocks said use input signal when said counter reaches a second predetermined value.

3. The limited-use appliance according to claim 1, wherein said test device stores a predetermined date value and said controller compares an actual date value with said predetermined date value, and wherein said test device blocks said use input signal when said actual date is later than said predetermined date value.

4. The limited-use appliance according to claim 1, wherein said at least one input device generates a bypass signal receivable by said controller to permanently disable said test device to always allow said use input signal to be sent on to said controller.

5. A method for pre-installing a barrier operator as a limited-use appliance, wherein full enablement of the appliance is only implemented upon procurement by either purchase or lease of an activation code, the method comprising
   pre-installing a barrier operator appliance with a controller, said controller operating said appliance in a limited manner and executing a test function, said appliance providing an activation number associated therewith;
   storing an activation code in a memory device maintained by said controller;
   associating at least one input device from a group of input devices with said controller, wherein at least one of said input devices generates a use input signal to operate said appliance and generates an activation code input signal to fully enable said appliance;
   inputting said activation code via said input signal from one of said input devices;
   testing a pre-determined criteria and whether said inputted activation code matches said stored activation code in said memory device maintained by said controller;
   blocking said use input signal from said controller when said pre-determined criteria is met; and
   preventing said controller from testing said predetermined criteria if said inputted activation code matches said stored activation code so that the limited-use appliance becomes fully operational.

6. The method according to claim 5, further comprising permanently preventing said controller from performing said blocking step if said inputted activation code matches said stored activation code so that said appliance operates in a fully functional manner.

7. The method according to claim 6, further comprising marking the appliance with said activation number.

8. The method according to claim 7, further comprising submitting said activation number and payment to a manufacturer; providing from said manufacturer said activation code derived from said activation number; and
   entering said activation code into one of said input devices selected from said group of input devices which in turn generates said input signal with said activation code.

9. The method according to claim 7, further comprising
submitting said activation number and payment to a manufacturer; and receiving from said manufacturer at least one of said input devices selected from said group of input devices which generates said activation code input signal.

10. The method according to claim 8, wherein said entering step comprises
entering said activation code into a keyless entry device which generates said activation code input signal.

11. The method according to claim 5, further comprising
setting a counter value for said pre-determined criteria; and
decrementing said counter value upon each cycle of said input device.

12. The method according to claim 5, further comprising
setting a date value for said predetermined criteria.

13. The method according to claim 7, further comprising
submitting said activation number and payment from a purchaser to a manufacturer over a computer network; and
returning said activation code to said purchaser over said computer network.

14. The method according to claim 6, further comprising
resetting said predetermined criteria upon receipt of said activation code by said controller, wherein said activation code is generated upon formation of a lease between a manufacturer of said appliance and a lessor.

15. The method according to claim 14, further comprising
permanently clearing said predetermined criteria and disabling said blocking step upon receipt of said activation code input signal by said controller, wherein said activation code is generated upon purchase of said appliance from a manufacturer.

16. The method according to claim 6, further comprising
permanently clearing said predetermined criteria and disabling said blocking step upon receipt of said activation code by said controller, wherein said activation code is generated upon purchase of said appliance from a manufacturer.

17. The method according to claim 5, further comprising
submitting said activation number and payment from a purchaser to a manufacturer over a computer network; and
returning said activation code to said controller over said computer network.

18. The method according to claim 5, further comprising
paying to an installer an installation fee for installation of said barrier operator appliance.

19. The method according to claim 6, further comprising
requesting installation of said barrier operator appliance by a contractor.

* * * * *